Patented Dec. 8, 1953

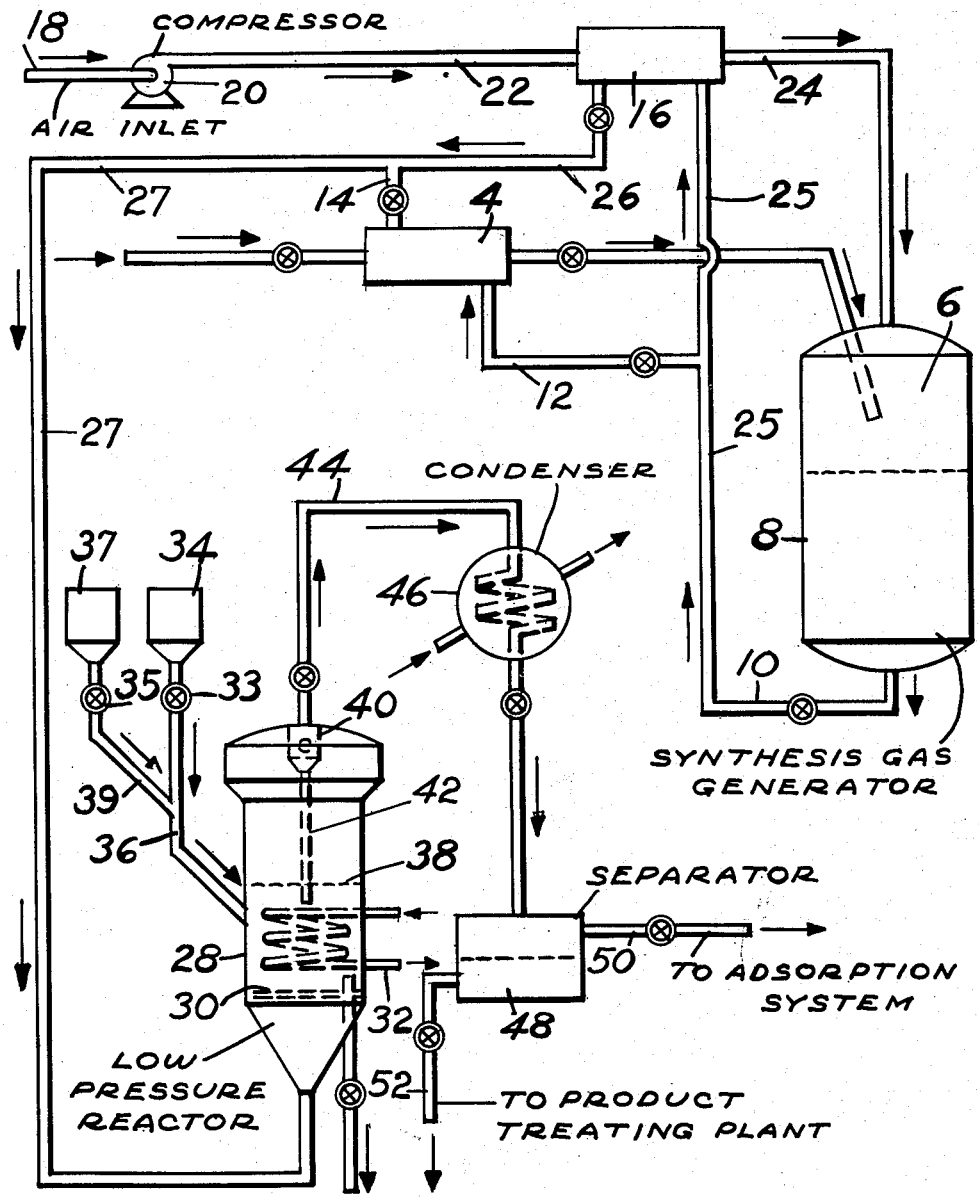

2,662,090

UNITED STATES PATENT OFFICE 2,662,090

HYDROCARBON SYNTHESIS

Walter G. Scharmann, deceased, late of Westfield, N. J., by Louie Randall Scharmann, executrix, Westfield, N. J., assignor to Standard Oil Development Company, a corporation of Delaware Application October 27, 1949, Serial No. 123,912

2 Claims. (Cl. 260—449.6)

The present invention relates to the catalytic reaction between carbon monoxide and hydrogen to form valuable liquid hydrocarbons. More particularly, the present invention is concerned with improvements in the reaction based on an improved composition of catalyst employed in the reaction.

The synthetic production of liquid hydrocarbons from gas mixtures containing various proportions of carbon monoxide and hydrogen is a matter of record, and numerous catalysts, usually containing an iron group metal, have been described which are specifically active in promoting the desired reactions at certain preferred operating conditions. For example, cobalt supported on an inert carrier is used when relatively low pressures of about 1 to 5 atmospheres and low temperatures of about 300 to about 425° F. are applied in the manufacture of a substantially saturated hydrocarbon product while at higher temperatures of 450–750° F. and higher pressures of 15–40 atmospheres required for the production of unsaturated and branch chained products of high antiknock value, iron type catalysts are more suitable.

In both cases, the reaction is strongly exothermic and the utility of the catalyst declines steadily in the course of the reaction chiefly due to deposition of non-volatile conversion products such as paraffin wax, carbon, and the like on the catalyst.

The extremely exothermic character and high temperature sensitivity of the synthesis reaction and the relatively rapid catalyst deactivation have led, in recent years, to the application of the fluid solids technique wherein the synthesis gas is contacted with a turbulent bed of finely divided catalyst fluidized by the gaseous reactants and products. This technique permits continuous catalyst replacement and greatly improves heat dissipation and temperature control.

It is general practice in iron-catalyst hydrocarbon synthesis operations to recycle tail gas back to the synthesis reactor in order to obtain high over-all conversion of synthesis gas components. However, the recycle gas operation is costly, both from the standpoint of investment and operation because of the large amounts of gas which must be handled in compressors and heat exchangers. In addition, since the fluid reactors have limitations with respect to gas velocities, the added gas volume, due to recycling, necessitates greater reactor cross section in order to stay within proper velocity limitations.

It would be highly desirable, therefore, to be able to operate a hydrocarbon synthesis plant in a once-through operation and to maintain the consumption ratio of the synthesis gas components the same as the feed ratio. Depending upon the source of the synthesis gas, the $H_2/CO$ ratio may vary considerably. Thus, when synthesis gas is obtained by the water gas reaction from coal, the $H_2/CO$ ratio of the gas is close to 1 to 1. On the other hand, when it is obtained from partial oxidation of methane, the ratio is closer to 2/1.

Furthermore, most processes for synthesis of hydrocarbons from synthesis gas obtained from coal or natural gas involve the production of relatively pure oxygen for the partial combustion of these raw materials to form CO and $H_2$ which are then reacted in a second step to form the desired hydrocarbons. In order to produce a highly unsaturated hydrocarbon product of high octane value, it is generally considered desirable to operate the synthesis reaction at high pressures of about 400 p. s. i. g. in the presence of an iron catalyst. This, however, involves production of relatively pure oxygen, also at high pressures. It would be uneconomic to employ air at high pressure rather than oxygen, because the recycle requirements associated with an iron catalyst to obtain high over-all consumption of $H_2$ and CO would result in the undesirable recirculation of a gas containing an ever-increasing amount of nitrogen.

As indicated above, it would be highly desirable to operate a hydrocarbon synthesis process by the fluid solids technique wherein the synthesis gas is prepared at lower pressures by air instead of by oxygen at high pressures, and wherein the synthesis itself is carried out at moderate instead of at high pressures, wherein a valuable olefinic motor fuel is obtained, and wherein tail gas is not recycled. The art shows many attempts in this direction in fixed bed processes. Thus, it has been attempted to prepare high octane motor fuel using a thoria-promoted cobalt catalyst on a silica gel catalyst. However, it was found that when the variables were adjusted in an effort to improve the liquid yield and the quality of the product, the yield of liquid products increases somewhat with pressure when the temperature is held constant, but the yield of wax increases also. This is quite undesirable because wax formation renders it extremely difficult to maintain a fluidized bed in the reactor. On the other hand, if the pressure is held constant in the relatively low pressure areas where cobalt catalyst functions well, that is, in the region of 15 to about 75 p. s. i. g., the olefin content of the product is low, and attempts to increase the olefinicity by increasing the temperature cause a decrease in liquid product yield and an increase in gas formation.

On the other hand, experience has indicated that operation with a conventional iron catalyst at the lower pressure is usually accompanied by severe carbonization of the catalyst as well as heavy formation of wax, both making the maintenance of a fluid catalyst bed a very great difficulty. Carbonization further causes rupture of iron catalysts resulting in formation of fines which eventually make impossible, maintenance of fluidization and temperature control.

It is the principal object of the present invention to provide an improved and flexible hydrocarbon synthesis process wherein recycle of tail gas is avoided and wherein the $H_2/CO$ consumption ratio within the reactor is substantially the same as the ratio in which $H_2$ and CO are present in the synthesis gas feed, irrespective of the source.

It is the principal object of the present invento to provide an improved hydrocarbon synthesis process operable at moderate pressures wherein high yields of valuable liquid synthesis products having a high degree of unsaturation are obtainable and wherein wax formation is minimized.

Other objects of the invention will in part be obvious and will in part appear hereinafter.

In the synthesis of hydrocarbons from carbon monoxide and hydrogen, particularly wherein the synthesis gas contains large quantities of nitrogen, it is obvious that a once-through operation is most desirable, because otherwise large quantities of inert material would be recycled, markedly decreasing the capacity of the plant and the operation. Such nitrogen is present when the synthesis gas is prepared by partial combustion of natural gas with air at moderate pressures, which is of marked economic advantage over preparing the same by combustion with pure oxygen under pressure. Furthermore, in the synthesis of hydrocarbons from CO and $H_2$ employing a once-through operation, it is apparent that the optimum consumption ratio of the reactants should be the same as their ratio in the synthesis feed gas, to avoid losses of unreacted $H_2$ and CO.

For example, in the production of synthesis gas by partial oxidation of methane and natural gas with air, hydrogen and CO are produced at a 2/1 ratio. When such a gas is used as a feed to the synthesis reactor, the elimination of oxygen in the form of water rather than carbon dioxide is essential for an approximately 2/1 $H_2/CO$ consumption ratio, in accordance with the reaction:

(1) $2nH_2 + nCO \rightarrow (CH_2)_n + nH_2O$

This is essentially the course of the reaction when cobalt is employed as a synthesis catalyst and cobalt is thus ideally suited for a once-through operation when the synthesis feed gas has an $H_2/CO$ ratio of 2/1. However, as indicated above and as is well known, cobalt catalyst is not conducive to formation of olefinic hydrocarbons valuable as motor fuel. On the other hand, when an iron catalyst is employed, the overall reaction can be more nearly represented by (2) $3nH_2 + 3nCO \rightarrow 2(CH_2)_n + nH_2O + nCO_2$ The $CO_2$ that occurs along with the products of the synthesis reaction, as in (2) above, may be a result of the reversible water gas shift reaction (3) $CO + H_2O \rightleftharpoons CO_2 + H_2$ Thus, in the synthesis reaction according to (1) above, the consumption ratio of hydrogen to carbon monoxide is 2/1. However, since some of the water formed in (1) may react with some unconverted CO in accordance with (3) hydrogen is formed and CO is consumed which in effect lowers the $H_2/CO$ consumption ratio. Carried to its limit, the ultimate effect of this reaction would be for all of the $H_2O$ formed to react rapidly and irreversibly with CO in which case the net synthesis reaction could be written as (4) $nH_2 + 2nCO \rightarrow (CH_2)_n + nCO_2$ giving an $H_2/CO$ consumption ratio of 0.5/1. From the above it may be seen that, starting with a 2/1 $H_2/CO$ feed gas, the $H_2/CO$ consumption ratio may vary from about 2/1 to almost 0.5/1 depending upon the degree to which the water gas shift reaction takes place.

During the normal synthesis with an iron catalyst, and iron is considered to be an excellent shift catalyst, the water gas constants $$K = \frac{(CO_2)(H_2)}{(CO)(H_2O)}$$

calculated from the gas concentrations in the reactor are only 60-95% of the known water-gas equilibrium constants at temperatures in the range of 550°–650° F. The known values for K at 550° F. and at 650° F. are about 50 and 23 respectively. The low calculated values indicate that the amounts of $CO_2$ and $H_2$ present are inadequate fully to satisfy the water gas shift equilibrium and that the reaction of CO and $H_2O$ is slower than the synthesis reaction.

Summarizing therefore, the removal of oxygen in the synthesis reaction when cobalt is employed as catalyst, appears to be accomplished by its elimination as water, and the reaction is accompanied by an $H_2/CO$ consumption ratio of about 2 to 1. However, the olefinicity of the product is low and the reaction is accompanied by significant wax formation. On the other hand, when an iron hydrocarbon synthesis catalyst is employed, oxygen is eliminated mainly in the form of $CO_2$, which latter must be recycled to the reactor in order to maintain high over-all conversion of $H_2$ and CO. Because of the water gas shift reaction, the overall $H_2/CO$ consumption is substantially less than the $H_2/CO$ ratio in the feed.

It has now been found that it is possible to operate a once-through hydrocarbon synthesis process and obtain high yields of olefinic hydrocarbons while maintaining $H_2/CO$ consumption ratios substantially the same as $H_2/CO$ fresh feed ratios by employing in the reaction zone a catalytic mixture comprising a special supported cobalt catalyst wherein part of the cobalt has been replaced by iron, together with a supported or unsupported alkali metal salt promoted iron type synthesis catalyst. The first-mentioned iron-cobalt catalyst, though more than 50% of the cobalt may be replaced by iron, not only produces excellent yields of olefinic products and substantially minimizes wax formation, but also consumes $H_2$ and CO as though there were no iron present, i. e. appears to eliminate oxygen as water and operates at an $H_2/CO$ consumption ratio up to about 2/1. Previous known modifications of iron synthesis catalyst were associated with H$_2$/CO consumption ratios considerably smaller than this.

Desirable as it is to utilize the special cobalt-iron supported catalyst in a once-through operation wherein the synthesis gas H$_2$/CO composition is about 2/1, the maximum utility of this catalyst is not realized when the H$_2$/CO ratio is less than this value, as about 1/1 when coal or water gas is the source of the synthesis gas. Thus, when operating at about 75 p. s. i. g. and at 500° F. with a feed gas of 1.15 H$_2$/CO ratio with this catalyst, a CO-rich tail gas is obtained with an H$_2$/CO consumption ratio of about 1.72–1.89.

In order to eliminate recycling of gas to the reactor and thereby operate on a once-through feed gas basis wherein high conversion of both CO and H$_2$ to products of high unsaturation are obtained, in accordance with the present invention, alkali promoted iron-type catalysts having specificity for unsaturated product formation and which are characterized by a high degree of CO conversion when employed in synthesis operation are mixed with a cobalt-iron-thoria catalyst supported on silica gel, which catalyst is also specific to formation of olefinic products but is further characterized in that it promotes high hydrogen rather than high CO conversion in the synthesis reaction. These mixtures are suitably adjusted in composition so that, when employed in a once-through synthesis operation with synthesis gas, H$_2$/CO ratio ranging from about 0.6 to about 2.0 which has been prepared from natural gas or carbonaceous solids by oxygen, air, or steam, the H$_2$/CO consumption ratio within the reactor is substantially the same as that in the synthesis gas feed.

The catalyst mixture of the present invention consists essentially of an alkali metal salt promoted iron-type hydrocarbon synthesis catalyst and a cobalt-iron catalyst promoted by thoria and supported on a siliceous carrier, preferably silica gel. The total cobalt + iron content of the supported catalyst may vary from 10–35% of the total weight of the catalyst, and the ratio of cobalt to iron on the supported catalyst may vary from about 10/6 to 1/6.

The invention will best be understood by referring to the accompanying diagrammatic representation of one of the modifications of the present invention, where suitable equipment and flow of material are shown for carrying out one embodiment of the invention. In this embodiment, synthesis gas obtained by partial oxidation of natural gas is employed, though it will be understood that any source of synthesis gas having any desired H$_2$/CO ratio within the limits of about 0.5 to 2.0 may be employed.

Referring now in detail to the drawing, natural gas from any convenient source preheated in preheater 4 is passed to synthesis gas producer vessel 6, which comprises a catalytic oxidation zone. Simultaneously, air is passed through line 18 into compressor 20, wherein it is moderately compressed to about 50–100 p. s. i. g. and the compressed material is passed through line 22 and preheater 16, wherein it is preheated to about 1200° F., and introduced into synthesis generation plant 6. In generator 6, partial oxidation mainly to CO and H$_2$ takes place. The temperature in the oxidation zone may be of the order of 2000–2500° F., the lower portion 8 of generator 6 may comprise a catalytic reformer bed, containing a reforming catalyst such as nickel or copper in magnesia, and any CO$_2$ and H$_2$O formed as a result of combustion in the upper part of the generator will reform unreacted methane to produce further quantities of H$_2$ and CO.

The hot synthesis gases leaving generator 6, which are at a temperature of about 1600–1800° F. are passed through line 10 and are preferably employed to preheat the incoming natural gas and air in preheaters 4 and 16, respectively, the synthesis gas stream being divided for this purpose to pass through lines 12 and 14, and through lines 25 and 26. The reunited synthesis gas stream, which has been cooled as indicated to about 450°–600° F., and may be further cooled, if desired, is passed to the bottom of hydrocarbon synthesis reactor 28. The latter is preferably in the form of a vertical cylinder with a conical base and an upper expanded section, and has a grid or screen located in the lower section to effect good gas distribution.

Within reactor 28, a mass of the catalyst described below is maintained in the form of a finely divided powder having a particle size distribution from about 100–400 mesh, preferably in the range of about 150–250 mesh. The catalyst mixture is supplied from catalyst hoppers 37 and 34 through lines 39 and 36 respectively. The catalyst supplied from hopper 37 may be any iron-type supported or unsupported hydrocarbon synthesis catalyst, such as pyrites ash, mill scale, reduced iron supported on an active carbon support, or the like, suitably promoted with alkali metal salt promoter such as sodium or potassium chloride, carbonate, etc. The catalyst supplied from hopper 34 is a mixed cobalt-iron catalyst supported on silica gel promoted with thoria, and which may have a total iron plus cobalt content of 10 to 35%. Thus, for illustrative purposes, catalyst supplied to reactor 28 from hopper 34 may have an iron content of about 3–25%, a cobalt content of 5 to 30%, thoria equivalent to 1–5% thorium, and silica of from 60 to 89%. The catalyst supplied from hopper 37 may be a reduced iron catalyst supported on active carbon, promoted with not less than 0.4% and not more than 1% K$_2$CO$_3$, the weight of iron being preferably 10–20% of the total catalyst. By suitable adjustment of valves 35 and 33, the amounts of the two catalysts may be proportioned to provide catalyst mixtures within 28 having the property of effecting substantially complete H$_2$ and CO consumption.

The synthesis gas mixture, having a molar ratio of H$_2$/CO of 2 or less, flows upwardly through grid 30. The linear velocity of the gas within the reactor is kept within the approximate range of 0.1–3.0 feet per second, preferably about 0.4–1.5 feet per second so as to maintain the catalyst in the form of a dense, highly turbulent fluidized mass having a well defined upper level 38 and an apparent density of from about 30–150 lbs. per cu. ft., depending upon the fluidization conditions.

The invention is particularly applicable for production of olefinic hydrocarbons at low pressures, and the pressure within reactor 28 is kept within the limits of 50–100 p. s. i. g., though, if desired, the process may be applied to the more conventional pressures associated with iron synthesis catalysts up to 400–500 p. s. i. g. The temperature is maintained constant within the limits of about 450°–650° F. Surplus heat from the exothermic reaction may be withdrawn by any conventional means, such as internal cooling coil 32.

Only a minor portion of the catalyst is carried into the disengaging section of the reactor above level 38, and these catalyst particles are separated from the reaction products in a conventional gas-solids separator, such as cyclone 40 and returned to the dense bed via dip pipe 42. The rate of gas throughput is in the range of 2-20 volumes of synthesis gas per weight of catalyst per hour. There are no provisions for tail gas recycle, as in accordance with the invention, this costly process is no longer necessary. As indicated below, under certain circumstances it may be desirable to omit cyclone 40 and to remove the catalyst fines overhead with the product gas stream.

Product vapor and gases are withdrawn overhead from reactor 28 and are passed through line 44 and condenser 46 to liquid products separator 48, wherein liquid products are separated from gases. The liquid products, containing high yields of olefins with little or no wax may be withdrawn through line 52 to further processing, such as fractionation, cracking of the gas oil fraction, isomerization, polymerization, etc., all in a manner known per se.

The uncondensed gases, comprising lower molecular weight hydrocarbons as well as unreacted synthesis gas and nitrogen, are preferably passed through line 50 to a fluidized solids active carbon adsorption plant, wherein light hydrocarbons may be removed and recovered by desorption at the lower pressures of the present operation, this represents a considerably more economical process than the conventional oil absorption of tail gas.

The present invention admits of numerous modifications apparent to those skilled in the art. Thus, instead of producing synthesis gas from partial combustion of natural gas or methane by air at low pressures, synthesis gas may also be prepared by the water gas reaction from coal. In such case, depending upon how heat is furnished to the process, either by direct combustion of coke or coal within the water gas generator with air or by recycling of hot combustion solids from a burner vessel, the synthesis gas may or may not contain appreciable quantities of nitrogen. The ratio of $H_2/CO$ in synthesis gas prepared from coal is about 1/1, and such a synthesis gas may be passed through a shift converter to increase the feed gas ratio from 1/1 to about 2/1 or any intermediate values. In such system, also, a sulfur removal step would be introduced, such as by passing the synthesis gases through spent synthesis catalyst to remove sulfur.

Furthermore, particularly when operating with low $H_2/CO$ feed gas, it may be desirable to dispense with cycle 40. Particularly in the case of iron catalyst, low $H_2/CO$ feed gas ratios combined with low synthesis reactor pressures are severe conditions, resulting in substantial catalyst disintegration, and it may be desirable to take overhead fines formed within synthesis reactor 28.

As for the catalyst, various modifications of the above type catalysts show similar and further improvement in the synthesis reaction.

The invention may be further illustrated by the following specific examples, representing fixed bed laboratory data:

Example I

The cobalt-iron silica catalyst may be prepared in the following manner.

Cobalt, iron and thorium, all as their hydrated nitrate salts, were mulled in a Simpson mixer with silica (as silica hydrogel containing about 18% solids) and the wet mixture passed through a colloid mill. The above composite was dried at about 250° F., then further heated for 48 hours at 420° F. and for an additional 5 to 6 hours at 550° F. to complete the decomposition of the nitrates. The resulting dried material was then ground to a suitable size and reduced with hydrogen at 700° F. at atmospheric pressure.

Example II

The following examples illustrate the relationship of the $H_2/CO$ consumption ratio to the nature of the synthesis catalyst:

| Catalyst | A | B | C | D |
|---|---|---|---|---|
| Temperature | 500 | 500 | 600 | 600 |
| Pressure | 75 | 75 | 75 | 75 |
| Feed Gas Ratio, $H_2/CO$ | 1.15 | 1.15 | 1.15 | 2.04 |
| CO conversion, percent Output | 60 | 54 | 83 | 97 |
| $H_2$ conversion, percent Output | 93 | 85 | 45 | 51 |
| $H_2/CO$ Consumption Ratio | 1.79 | 1.81 | 0.62 | 1.08 |
| $C_4+$ Yield, cc./m.³ $H_2+CO$ consumed | 180 | 187 | 215 | 174 |
| Est. unsaturation, Init. —400° F., percent | 66 | 42 | 77 | |

In the above table, catalyst A has the following composition: 25.2% Co, 2.8% Fe, 4.4% Th, and 67.6% $SiO_2$. It is prepared similarly as the catalyst described in Example I.

Catalyst B is a conventional cobalt catalyst, consisting of 30% Co, 1% $ThO_2$, 3% MgO and 66% $SiO_2$, promoted with 2% Na (as $Na_2CO_3$, based on Co).

Catalyst C is an iron catalyst supported on an active carbon carrier. It contains 14.9% iron and is promoted with 0.5% $K_2CO_3$.

Catalyst D is a reduced resintered iron pyrites ash catalyst promoted with $K_2CO_3$.

The above data clearly indicate the high $H_2$ conversions, relatively low CO conversions and high consumption ratios obtained with cobalt and mixed Co-Fe catalyst precipitated on a silica gel carrier. The data also show that at the moderate pressures employed, the conventional cobalt catalyst produces a product of low olefinicity. Hence, though the consumption ratio is high in both the CO and the Co-Fe catalyst, the former is not particularly suitable for the production of motor fuel in accordance with the present invention. It will be noted that in the case of catalysts A and B, hydrogen conversions were high and CO conversion low. On the other hand, in the case of catalysts C and D, hydrogen conversions were low but CO conversions high.

Example III

To illustrate the high hydrogen and high carbon monoxide conversion levels obtainable by operating in accordance with the invention, a catalyst was prepared consisting of about 50% of a KCl-promoted iron pyrites ash and 50% of a mixed cobalt-iron-thoria silica catalyst. The catalytic mixture was prepared as follows:

The pyrites component was prepared by impregnating 99 parts of sintered iron pyrites ash with an aqueous solution of 1% KCl. The mixed cobalt-iron catalyst compound was prepared by mulling the nitrates of cobalt, thorium and iron with silica hydrogel followed by drying and heating to decompose the nitrates. On a reduced basis, this component consisted of 25.2% Co, 2.8% Fe, 4.4% Th, and 67.6% $SiO_2$. The dried and heated product last-named was then mixed in a ball mill with the first-named pyrites ash and after mechanical mixing, the resultant powder was pilled and reduced with hydrogen at 700° F. for 4 hours. The final catalyst contained about 51.4% Fe, 0.5% KCl, 12.6% Co, 1.4% Th, 33.8% $SO_2$.

The catalyst thus prepared was tested in a fixed bed laboratory unit under synthesis conditions including a temperature of 500° F., 75 p. s. i. g. pressure and a 2/1 $H_2/CO$ feed.

| | |
|---|---|
| Temperature, °F. | 500 |
| Pressure, p. s. i. g. | 75 |
| Feed gas ration, $H_2/CO$ | 1.9 |
| Feed rate, v./v./hr. | 100 |
| CO conversion, per cent | 99.8 |
| $H_2$ conversion, per cent | 96 |
| $H_2/CO$ consumption ratio | 1.81 |
| $C_4$+yield, cc./m.$^3$ $H_2$+CO consumed | 176 |

From the above table, it may be seen that by suitably proportionating the two catalyst components in the reactor, practically complete conversion of the synthesis gas constituents is obtained, thus making feasible a once-through synthesis operation.

Thus, in accordance with the invention, hydrocarbon synthesis is carried out under once-through conditions with high conversions of $H_2$ and CO with mixtures of catalysts possessing individually not only the characteristics of eliminating oxygen primarily as CO or $H_2O$, but also, the characteristic of producing unsaturated products of high selectivity.

While the foregoing description and exemplary operation have served to illustrate specific applications and results of the invention, other modifications obvious to those skilled in the art are within its scope.

What is claimed is:

1. An improved process for converting carbon monoxide and hydrogen to normally liquid hydrocarbons of high olefin content and whereby high conversion levels of carbon monoxide and hydrogen are attained which comprises contacting a feed gas comprising carbon monoxide and hydrogen in synthesis proportions at synthesis conditions with a dense turbulent fluidized mass of finely divided synthesis catalyst, said catalyst comprising a physical mixture of separate discrete particles of definite composition, one component of said mixture comprising an alkali metal salt, promoted iron catalyst and the second component of said mixture comprises a support carrying as active component, a mixture of cobalt and iron promoted with a minor amount of thoria, the said total combined catalyst consisting essentially of 51.4% iron, 0.5% KCl, 12.6 Co, 1.4% Th and 33.8% $SiO_2$ by weight.

2. An improved catalyst for the synthesis of normally liquid hydrocarbons of high olefin content by the conversion of CO and $H_2$ which comprises a physical mixture of an iron catalyst and a finely divided silica gel support carrying as active component a mixture of iron and cobalt promoted with a minor amount of thoria, said catalytic mixture consisting essentially of 51.4% Fe, 0.5% KCl, 12.6% Co, 1.4% Th and 33.8% $SiO_2$.

LOUIE RANDALL SCHARMANN,
*Executrix of the estate of Walter G. Scharmann, deceased.*

References Cited in the file of this patent

UNITED STATES PATENTS

| Number | Name | Date |
|---|---|---|
| 1,798,288 | Wietzel et al. | Mar. 31, 1931 |
| 1,801,382 | Wietzel et al. | Apr. 21, 1931 |
| 2,234,246 | Groombridge et al. | Mar. 11, 1941 |
| 2,274,639 | Scheurmann et al. | Mar. 3, 1942 |
| 2,406,864 | Thomas | Sept. 3, 1946 |
| 2,414,276 | Sensel | Jan. 14, 1947 |
| 2,467,861 | Scharmann | Apr. 19, 1949 |
| 2,483,771 | Holder | Oct. 4, 1949 |